Feb. 18, 1947.  N. A. HASSLER  2,415,879
ELECTRICAL SYSTEM FOR USE IN PHOTORECORDING
Filed July 31, 1944
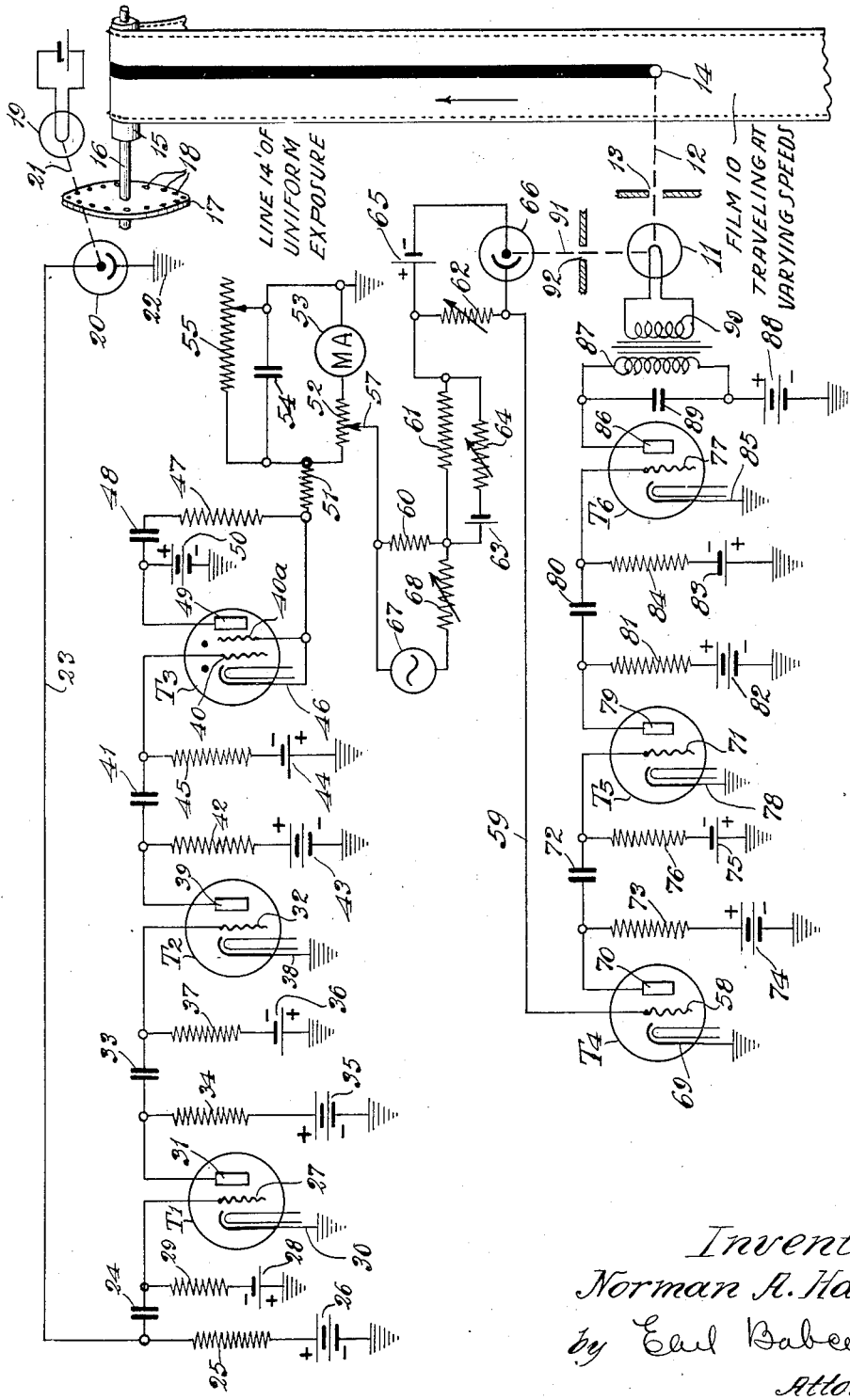
Inventor
Norman A. Hassler
by Earl Babcock
Attorney.

Patented Feb. 18, 1947

2,415,879

UNITED STATES PATENT OFFICE 2,415,879

ELECTRICAL SYSTEM FOR USE IN PHOTORECORDING

Norman A. Hassler, Duncan, Okla., assignor to Halliburton Oil Well Cementing Company, Duncan, Okla.

Application July 31, 1944, Serial No. 547,486

6 Claims. (Cl. 234—1.5)

This invention relates to electrical systems for use in photorecording and more particularly to an arrangement in which a photosensitive recording surface such as a film is moved with respect to an electrical incandescent lamp and subjected to the light emitted by the lamp.

In photorecording systems it is frequently desirable to move a photosensitive recording surface such as a film at varying speeds. For example, in the electrical logging of oil wells a photosensitive film is geared to an electrode which is lowered into the oil well and a correlation is made between the depth of the electrode in the well and a particular point on the film. The movement of the electrode in the well cannot be maintained at a uniform speed, and so the film in the recorder cannot be moved at a uniform speed.

The sensitivity of film to light being uniform, a record made by subjecting the film to a source of light is not good if the intensity of the light remains constant while the film is moved at different speeds. To remedy this defect mechanical means have heretofore been proposed. For example, the size of the aperture through which the light shines upon the film has been reduced when the speed of the film is reduced from standard so as to compensate for the change in speed.

It is an object of the present invention to devise electrical means for controlling or regulating the amount of light emitted by an electrical incandescent lamp to cause it to be in direct proportion to the speed of a moving object, such, for example, as the speed of a film.

It is a further object of the invention to provide means for exposing a photographic film to light uniformly while moving the film at varying speeds, by regulating the amount of light projected upon the film and causing the amount of light to be in proportion to the speed of the film moving past the light.

Other objects and advantages reside in certain novel features of the arrangement, as will be apparent from the following description taken in connection with the accompanying drawing, in which:

The single figure is a diagrammatic representation of an electrical system illustrating one way of carrying out the principles of the present invention.

Referring to the drawing in detail, it will be seen that a photographic film is shown at 10, mounted for movement with respect to an electrical incandescent lamp 11 which causes a beam of the light 12 to pass through an aperture 13 to project a spot of light 14 upon the film 10. The spot of light 14 causes a line 14' of uniform exposure to appear on the film when the film is developed. The mechanism for moving the film 10 is not shown in the drawing, and forms no part of the present invention, but mechanism in diagrammatically shown which is responsive to movement of the film 10. This is shown merely as a roller 15 on a shaft 16, which is geared to the film, with a disk 17 mounted on the shaft 16 (although in actual practice a gear train may be employed to make the relative angular speeds of the disk 17 and the roller 15 other than unity).

The disk 17 contains a number of uniformly spaced perforations or holes 18. This device is known as a "chopper" and serves to interrupt the passage of light from an incandescent lamp 19 to a photoelectric cell 20. A beam of light from the lamp 19 passing through one of the holes 18 to the cell 20 is illustrated in the drawing by the dash line 21. Since this beam of light passes through the holes 18, the speed of rotation of the disk 17 controls the frequency of the interruptions of the light beam 21.

One element of the photoelectric cell 20 is grounded as shown at 22. The other is connected by means of wire 23 to resistance coupling associated with the input circuit of a vacuum tube $T_1$ which functions as an alternating current amplifier. The resistance coupling is illustrated as consisting of a condenser 24, a resistance 25 connected to the positive terminal of a "B" battery 26, and a resistance 29. The condenser 24 is connected to the grid 27 of the vacuum tube $T_1$ and a small battery 28 connected to the resistance 29 puts a negative bias on the grid 27.

The cathode 30 of the tube $T_1$ is grounded as illustrated. Throughout the drawing the tubes are illustrated as having indirectly heated cathodes. To simplify the diagram, the "A" supply to the filaments are not included.

The plate 31 of tube $T_1$ is connected through resistance coupling to the grid 32 of the tube $T_2$. The resistance coupling is the same as that for the tube $T_1$, and consists of a condenser 33, a resistance 34 connected to the positive terminal of a "B" battery 35 and a resistance 37. A small battery 36 is connected to resistance 37 to put a negative bias on the grid 32. The cathode 38 of the tube $T_2$ is grounded and the plate 39 is resistance coupled to the control grid 40 of the tube $T_3$. As before, the resistance coupling between the tubes $T_2$ and $T_3$ includes a condenser 41 and a resistance 42 connected to the positive terminal of a "B" battery 43 and a resistance 45.

A small battery 44 is connected to resistance 45 to put a negative bias on the grid 40.

The tube T₃ contains an auxiliary grid 40a which is connected to the cathode 46, both the grid 40a and the cathode 46 being connected through a resistance 47, and a condenser 48 to the plate 49 of the tube T₃. A "B" battery 50 connected directly thereto supplies the potential to the plate 49.

The tube T₁ functions as an ordinary alternating current amplifier. The current in the output of this tube has a frequency the same as that of the interruptions of the beam of light 21 by the perforated disk 17. Thus the tube T₁ together with the chopper 17, cell 20 and connections constitutes an alternating current generator, the frequency of which is proportional to the speed of the film 10.

The tube T₂ also functions as an alternating current amplifier and the frequency of its output is the same as that of the tube T₁. However, this tube is overloaded and the output thereof has a wave shape which is approximately square.

The tube T₃ is a gas-filled tube and the output therefrom is unidirectional, there being a pulse in the plate circuit each time the disk 17 permits the flow of light from the lamp 19 to the cell 20.

The square wave output of tube T₂ is applied to the grid 40 of tube T₃ in such a manner that the grid receives a voltage pulse of short duration once each cycle which serves to start conduction in the plate circuit of tube T₃. When tube T₃ is conducting, condenser 48 discharges through it and the current limiting resistance 47. When condenser 48 is discharged, tube T₃ ceases to conduct until the next cycle and condenser 48 recharges. This charging current flows through the milliammeter 53 and its associated circuit. Thus the metering circuit current consists of a series of unidirectional pulses of equal energy value whose average current, as read by the milliammeter 53, depends only upon the frequency with which they occur. This frequency is proportional to the rate of rotation of the perforated disk 17, and proportional to the speed of film 10. If desired, this milliammeter may be calibrated in units of speed.

To eliminate the effect of pulsations of current in the system an electrical filter may be connected across the resistance 52 and the milliammeter 53, this filter being illustrated in the drawing as consisting of a condenser 54. The adjustable resistance 55 in parallel with resistance 52 and milliammeter 53 serves as a calibration control and may be used to compensate for variations between tubes should it be necessary to change them.

The apparatus so far described might be termed an electrical speedometer or electrical frequency meter in which the frequency is controlled by the speed of a moving object, in this case the film 10. Since the film 10 may be geared to some other object such as an electrode being moved in an oil well, or since the disk 17 may be geared to some other object moving in synchronism therewith it is obvious that the electrical system could be used to measure the speed of devices other than that illustrated in the drawing.

From what has been shown above, it will now be clear that if the lamp 11 is caused to emit light in proportion to the amount of energy in the plate circuit of the vacuum tube T₃, it will also emit light in proportion to the speed of the film 10.

An adjustable tap 57 is provided on the resistance 52 so that the voltage drop across the portion of the resistance 52 between the tap 57 and the ground is taken off. This tap 57 is connected through a number of resistances to the grid 58 of a tube T₄, by means of a wire 59. The resistances in series are designated 60, 61 and 62.

In the circuit illustrated, potential on the grid 58 depends upon voltage drops across these resistances. A battery 63 in series with a variable resistance 64 is connected across resistance 61 and a battery 65 in series with a photoelectric cell 66 is connected across the resistance 62, which is variable. An A. C. source 67 in series with a variable resistance 68 is connected across resistance 60. With such a circuit, there is a voltage drop across each of the resistances 52, 60, 61 and 62. The algebraic sum of the D. C. voltage drops across resistances 52, 61 and 62 due to the output of the tube T₃ and to the batteries 63 and 65 respectively constitutes the D. C. potential or regulating bias on the grid 58 and may be said to modulate the A. C. voltage drop across resistance 60 due to the source 67, all of these voltage drops being impressed upon the grid 58.

The plate 70 of tube T₄ is connected by resistance coupling to the grid 71 of tube T₅, the resistance coupling consisting of the condenser 72, resistance 73 connected to the positive terminal of "B" battery 74 and resistance 76. To place a bias on the grid 71, a small battery 75 has its negative terminal connected to the grid 71 through the resistance 76.

The output of the tube T₅ is similarly connected to an amplifier tube T₆, the plate 79 of the tube T₅ being connected through a condenser 80 to the grid 77. A "B" battery 82 has its positive terminal connected through a resistance 81 to the plate 79 and a small battery 83 has its negative terminal connected through resistance 84 to the grid 77. The plate 86 of the tube T₆ is connected to the primary 87 of a transformer which is in turn connected to the positive terminal of a "B" battery 88. A condenser 89 is connected across the primary 87. The secondary 90 of the transformer is connected to the filament of the lamp 11.

The amplification of an A. C. voltage by a triode is a function of the D. C. potential or bias on its grid. The D. C. voltage drop across resistance 52 due to output of tube T₃ is one component of the bias on the grid 58 of tube T₄. Therefore, variations in voltage of the output of tube T₃ affect the A. C. output of tube T₄, and consequently the energy supplied to the lamp 11. The output of tube T₃ must be so connected, as to polarity, that an increase in voltage drop across resistance 52 causes an increase in output of tube T₄.

By means of the variable resistance 64, the voltage drop due to the battery 63 is adjusted to introduce an additional bias voltage into the circuit of grid 58 which serves to adjust the light output of lamp 11 to zero when the voltage drop across resistance 52 is zero.

By means of the variable resistance 68, the A. C. voltage from the source 67 across resistance 60 should be made of such magnitude that the lamp 11 will have the maximum desired light output when the grid bias of tube T₄ is such that its amplification is a maximum. The frequency of source 67 should be high enough that the amplifier may be designed to amplify it without also amplifying the variations in voltage across resistance 52. For example, the frequency of source 67 may be 1,500 cycles per second where the maximum rate of change in the voltage drop across resistance 52, is less than that of a corresponding A. C. voltage of several cycles per second.

By means of variable resistance 62 an adjustment can be made when lamp 11 is giving off light, which will vary the amount of light given off by the lamp 11 to bring about a predetermined relation between the light output and a given voltage drop across resistance 52. As shown hereinafter, this relation, when once obtained for a given voltage drop across resistance 52 is automatically maintained by the circuit which includes the cell 66, without further adjustment.

The photoelectric cell 66 referred to above is placed adjacent the incandescent lamp 11 so as to be illuminated by a beam of light therefrom. In the drawing this is indicated by the dash line 91 passing through an aperture 92.

During operation, there are only two factors which vary or control the amount of energy supplied to the lamp 11 through the amplifier network, these being the amount of direct current voltage variation across resistance 52 and the variation in voltage across resistance 62 caused by the variation in the current flow through the photoelectric cell 66 (the resistances 64 and 68 not being adjusted during operation and the voltages of the sources 67, 63 and 65 remaining constant).

In the absence of the circuit containing the photoelectric cell 66, the amplifier network shown is such as to cause an alternating current to be applied to the lamp 11, the voltage of which is approximately proportional to the direct current voltage drop across resistance 52. If the lamp 11 emitted light in proportion to the voltage applied thereto, no further control would be necessary to accomplish the purpose of the invention, but there are no known incandescent filament lamps which have this characteristic.

To cause the lamp 11 to approach the desired operation, that is, to cause it to emit more or less light in proportion to increase or decrease in the voltage drop across resistance 52 and hence in proportion to the speed of film 19, the system of the present invention has been devised.

The photoelectric cell 66 and the associated battery 65 and resistance 62 may be said to constitute a photoelectric negative feed-back circuit from the lamp 11 to the tube T4. This feed-back circuit causes the change in the amount of light given off to become proportional to the voltage drop across resistance 52.

This function is accomplished in part by the selection of values for the component parts of the photoelectric cell circuit so that the voltage across the resistance 62 will be proportional to the intensity of the light striking the cell from the lamp 11. Since the current flow of the cell 66 varies in proportion to the light intensity therein, the voltage drop across the resistance 62 varies in proportion to the intensity of the light given off by the lamp 11.

In addition to the selection of proper values, the arrangement must be such that the voltage across resistance 62 is introduced into the grid circuit of tube T4 in opposition to the voltage drop across resistance 52. The difference between these voltages then controls the amount of energy supplied to the lamp 11. If this difference is made small, i. e., if the voltage drop across the resistance 62 is made approximately equal to the voltage drop across resistance 52 then the light output will be approximately proportional to the voltage drop across resistance 52. The voltage drop across the resistance 62 cannot be made absolutely identical with the voltage drop across resistance 52 because if that condition always prevailed there would be no change in input to the tube T4. However, the amplifying network can be so designed as to have high amplification, so that the difference in these voltages required to obtain any desired light output from the lamp 11 will be very small.

It will be apparent that the system is not dependent upon the exact relation of current to light intensity of the lamp 11 or to any other characteristics of the lamp 11. The photoelectric feed-back circuit is such that the characteristics of the lamp are not controlling of the amount of energy fed back. The amount of light emitted is the controlling factor.

Since there are a number of photoelectric cells on the market, and since some have been designed to be sensitive to particular light waves, care should be exercised in selecting the cell. The photoelectric cell 66 should be so selected as to be sensitive to the same range of the spectrum as that to which the film 19 is sensitive, if the best results are to be obtained with that film.

In the accompanying drawing only one embodiment of the invention is shown and the circuits involved here have been reduced to the simplest possible form in which they will operate and illustrate the principles involved. This was accomplished by making each voltage supply separate and independent of all others. It is to be understood that in practice all D. C. voltages necessary for the operation of the various circuits may be derived from a common power supply. The required circuit changes, stabilizing networks and decoupling networks necessary to permit this are known to those skilled in the art and need not be described here.

Thus, it is obvious that various changes may be made without departing from the spirit of the invention or the scope of the annexed claims.

I claim:

1. An electrical control system comprising a thermionic amplifier network, a lamp connected to the output thereof and an arrangement for causing said lamp to emit light in proportion to the speed of a moving object, said arrangement including means driven in synchronism with the moving object for generating an alternating current the frequency of which is proportional to the speed of the moving object, means for impressing a regulating bias on said amplifier network proportional to the frequency of the alternating current so generated and photoelectric means for modifying the regulating bias in accordance with the intensity of the light given off by said lamp.

2. An electrical control system comprising an alternating current thermionic amplifier network, a lamp connected to the output thereof and an arrangement for causing said lamp to emit light in proportion to the speed of a moving object, said arrangement including means driven in synchronism with the moving object for generating an alternating current the frequency of which is proportional to the speed of the moving object, means for generating a direct current the voltage of which is proportional to the frequency of the alternating current so generated, means for impressing a regulating bias on said amplifier network proportional to the voltage of the direct current so generated and photoelectric means for modifying the regulating bias in accordance with the intensity of the light given off by said lamp.

3. An electrical control system comprising a thermionic amplifier network, a lamp connected to the output thereof and an arrangement for causing said lamp to emit light in proportion to the speed of a moving object, said arrangement including means driven in synchronism with said object for generating a direct current the voltage of which is proportional to the speed of the moving object, means for impressing a regulating bias on said amplifier network proportional to the voltage of the direct current so generated and photoelectric means for modifying the regulating bias in accordance with the intensity of the light given off by said lamp.

4. An electrical system adapted for use in combination with photosensitive material exposed to light emitted from a source of light while moving the material past the source at varying speeds, said system including a thermionic amplifier network, a lamp connected to the output thereof and adapted to provide the source of light for exposing the photosensitive material and an arrangement for causing said light to emit light in proportion to the speed of the material past the lamp, said arrangement including means driven in synchronism with the material for generating a source of current, some characteristic of which is proportional to the speed of the material, means for impressing a regulating bias on said amplifier network in proportion to variations in such characteristic and photoelectric means for modifying the regulating bias in accordance with the intensity of the light given off by said lamp.

5. An electrical system adapted for use in combination with photosensitive material exposed to light emitted from a source of light while moving the material past the source at varying speeds, said system including a thermionic amplifier network, a lamp connected to the output thereof and adapted to provide the source of light for exposing the photosensitive material and an arrangement for causing said light to emit light in proportion to the speed of the material past the lamp, said arrangement including means for impressing a regulating bias on said amplifier network in proportion to the speed of said photosensitive material and photoelectric means for modifying the regulating bias in accordance with the intensity of the light given off by said lamp.

6. An electrical control system comprising a thermionic amplifier network, a lamp connected to the output thereof and an arrangement for causing said lamp to emit light in proportion to the speed of a moving object, said arrangement including means for impressing a regulating bias on said amplifier network in proportion to the speed of the moving object and photoelectric means for modifying the regulating bias in accordance with the intensity of the light given off by said lamp.

NORMAN A. HASSLER.